(12) United States Patent
Logan et al.

(10) Patent No.: US 10,197,417 B2
(45) Date of Patent: Feb. 5, 2019

(54) MONITORING ACTIVITY WITH INTELLIGENT FABRICS

(71) Applicant: Twin Harbor Labs, LLC, Plano, TX (US)

(72) Inventors: James D Logan, Candia, NH (US); Eric Carr, Plano, TX (US)

(*) Notice: Subject to any disclaimer, the term of this patent is extended or adjusted under 35 U.S.C. 154(b) by 126 days.

(21) Appl. No.: 15/144,396

(22) Filed: May 2, 2016

(65) Prior Publication Data

US 2016/0245665 A1 Aug. 25, 2016

Related U.S. Application Data

(63) Continuation-in-part of application No. 14/848,303, filed on Sep. 8, 2015, now Pat. No. 9,330,558.

(Continued)

(51) Int. Cl.
| | |
|---|---|
| *G01C 22/00* | (2006.01) |
| *H04W 4/80* | (2018.01) |
| *A41D 1/00* | (2018.01) |
| *D06F 39/00* | (2006.01) |
| *G01K 13/00* | (2006.01) |

(Continued)

(52) U.S. Cl.
CPC ........... *G01C 22/006* (2013.01); *A41D 1/002* (2013.01); *D06F 39/00* (2013.01); *G01K 13/002* (2013.01); *G01W 1/00* (2013.01); *G06K 19/027* (2013.01); *G06Q 10/06398* (2013.01); *G07C 3/00* (2013.01); *G07C 9/00* (2013.01); *G07C 9/00111* (2013.01); *G08B 21/24* (2013.01); *H04M 1/7253* (2013.01); *H04W 4/80* (2018.02); *D06F 93/005* (2013.01)

(58) Field of Classification Search
CPC .............................. G01C 22/006; A41D 1/002
USPC ........................................... 702/160; 340/687
See application file for complete search history.

(56) References Cited

U.S. PATENT DOCUMENTS

| | | | |
|---|---|---|---|
| 6,801,140 B2 * | 10/2004 | Mantyjarvi | ............ A41D 1/005 |
| | | | 24/381 |
| 7,519,192 B1 | 4/2009 | Laycock et al. | |

(Continued)

FOREIGN PATENT DOCUMENTS

| | | |
|---|---|---|
| CN | 202635650 U | 1/2013 |
| CN | 103156314 A | 6/2013 |

(Continued)

OTHER PUBLICATIONS

Das, Subrata Chandra, et al, "Smart Textiles—New Possibilities in Textile Engineering", International COnference on Mechanical, Industrial, and Materials Engineering 2013, Nov. 1-3, 2013.

(Continued)

*Primary Examiner* — Caleb Henry

(57) ABSTRACT

Textiles coupled with electrical components that are responsive to actions of the wearer and the surrounding environment. The textiles comprise a variety of sensors that interface with the cloud, networks, and devices. The textiles monitor physiological characteristics of the wearer. Objects in the environment may interact with the electrical components of the textiles. Micro-Electro-Mechanical Systems that include electrical components, such as, accelerometers, gyroscopes, Bluetooth chips, NFC chips, and RF tags integrate with the textiles to wirelessly communicate with networks.

16 Claims, 3 Drawing Sheets

Related U.S. Application Data

(60) Provisional application No. 62/047,684, filed on Sep. 9, 2014.

(51) Int. Cl.

| | | |
|---|---|---|
| *G08B 21/24* | (2006.01) | |
| *G06K 19/02* | (2006.01) | |
| *G07C 9/00* | (2006.01) | |
| *H04M 1/725* | (2006.01) | |
| *G01W 1/00* | (2006.01) | |
| *G06Q 10/06* | (2012.01) | |
| *G07C 3/00* | (2006.01) | |
| *D06F 93/00* | (2006.01) | |

(56) References Cited

U.S. PATENT DOCUMENTS

| | | | |
|---|---|---|---|
| 8,221,291 | B1 | 7/2012 | Kantarevic |
| 8,253,586 | B1 | 8/2012 | Matak |
| 8,707,580 | B2 | 4/2014 | Hopkins |
| 8,930,012 | B2 | 1/2015 | Fernandez |
| 9,259,613 | B2* | 2/2016 | Case, Jr. ............... A41D 1/002 |
| 9,531,415 | B2* | 12/2016 | Stelfox ............. G06K 7/10227 |
| 2002/0084901 | A1 | 7/2002 | Mantyjarvi et al. |
| 2008/0218310 | A1 | 9/2008 | Alten et al. |
| 2009/0195400 | A1 | 8/2009 | Oreshkin |
| 2010/0078457 | A1 | 4/2010 | Pitchford et al. |
| 2011/0132378 | A1* | 6/2011 | Levendowski .......... A61B 5/11 |
| | | | 128/848 |
| 2013/0211208 | A1 | 8/2013 | Varadan et al. |
| 2013/0234644 | A1 | 9/2013 | Weeks et al. |
| 2013/0328783 | A1 | 12/2013 | Martin et al. |
| 2014/0090146 | A1 | 4/2014 | Yeomans et al. |
| 2014/0222173 | A1 | 8/2014 | Giedwoyn et al. |
| 2014/0278218 | A1 | 9/2014 | Chang |
| 2014/0288682 | A1* | 9/2014 | Balakrishnan ..... A63B 71/0686 |
| | | | 700/91 |
| 2015/0057984 | A1 | 2/2015 | Nicoletti et al. |
| 2015/0145671 | A1 | 5/2015 | Cohen et al. |
| 2015/0359457 | A1 | 12/2015 | Blumenthal et al. |
| 2016/0071397 | A1* | 3/2016 | Logan ................... A41D 1/002 |
| | | | 340/687 |
| 2017/0056721 | A1* | 3/2017 | Stelfox .............. G06K 7/10227 |

FOREIGN PATENT DOCUMENTS

| | | |
|---|---|---|
| CN | 103126111 A | 11/2013 |
| CN | 203662042 U | 6/2014 |
| DE | 102010022878 A1 | 12/2011 |
| WO | 2012060524 A1 | 5/2012 |
| WO | 101346769 B1 | 12/2013 |
| WO | 2014066729 A1 | 5/2014 |

OTHER PUBLICATIONS

Bullis, Kevin, "A New Chip Could Add Motion Sensing to Clothing", MIT Technology Review, Aug. 19, 2014.
McCann, J and D. Bryson, "Smart Clothes and wearable technology", CRC Press, LLC, 2009.
Cho, Gilsoo, "Smart Clothing Technology and Applications", CRC Press, 2009.
Purcher, Jack, "Apple Wins Smart Garment & iPhone, Circuit Board Patents", Patently Apple Blog, Jan. 17, 2012.
"See gains faster", Athos website, downloaded from https:/www.liveathos.com on Sep. 4, 2015.
Tao, Leena, "Backed with $3.5M From Social+Capital, Athos Is Creating Connected Workout Clothing That Tracks Your Muscle Output and More", TechCrunch, Nov. 26, 2013.
Niazmand, K., et al, "Freezing of Gait detection in Parkinson's disease using accelerometer based smart clothes", Biomedical Circuits and Systems Conference, 2011, IEEE, Nov. 10-12, 2011.
Barr, Philippa N, et al, "Dead battery? Charge it with your clothes", The Conversation, Jun. 11, 2014.
Dodson, Brian, "Cityzen smart shirt tracks your health, recharges during washing", Gizmag, Feb. 3, 2014.
"Smart Bikini Protects from UV Light", Genius Beauty, Oct. 6, 2008.
"Stride", 4iiii Innovations, Inc. web page downloaded from http://4iiii.com/product/stride/ on Sep. 4, 2015.
"About", Lilypad, web page downloaded from http://lilypadarduino.org/ on Sep. 4, 2015.
"Meet Lumo Lift", Lumo Bodytech, Inc, web page downloaded from https://www.lumobodytech.com/ on Sep. 4, 2015.
"Myontec Designs Intelligent Clothing", Myontec, Ltd, web page downloaded from http://www.myontec.com/en/ on Sep. 4, 2015.
"How it works", OMsignal, Inc., web page downloaded from http://www.omsignal.com/pages/how-it-works on Sep. 4, 2015.
Marmey, Emilie, "Smart Hospital Gown", FashionLab, Oct. 17, 2012, web page downloaded from http://fashionlab.3ds.com/smart-hospital-gown/ on Sep. 9, 2015.
"Monitoring patient using intelligent t-shirts", Universidad Carlos III de Madrid, web page downloaded from http://portal.uc3m.es/portal/page/portal/actualidad_cientifica/noticias/intelligent_tshirts on Sep. 9, 2015.
Boxall, Andy, "Goodbye fitness bands: soon, motion sensors will be woven right into our clothes", Digital Trends, Dec. 11, 2014, web page downloaded from http://www.digitaltrends.com/wearables/cambridge-consultants-xellex-fiber-optic-thread/ on Sep. 9, 2015.
Szcerba, Robert J., "Fashion 2.0—Complement Your Smart Phone With Smart Clothes", Forbes, Nov. 14, 2014, web page downloaded from http://www.forbes.com/sites/robertszczerba/2014/11/14/fashion-2-0-complement-your-smart-phone-with-smart-clothes/?partner=yahootix on Sep. 9, 2015.

\* cited by examiner

Figure 1A
Figure 1B
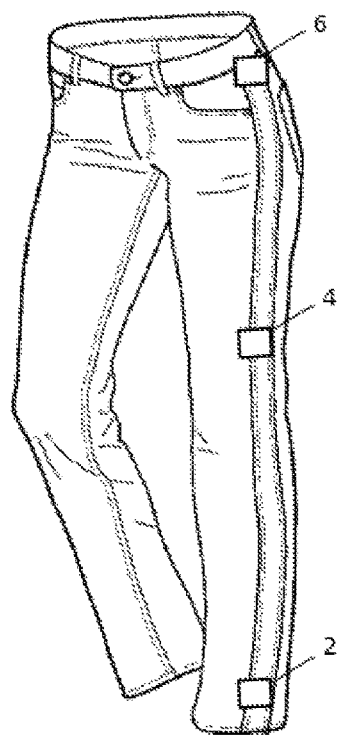
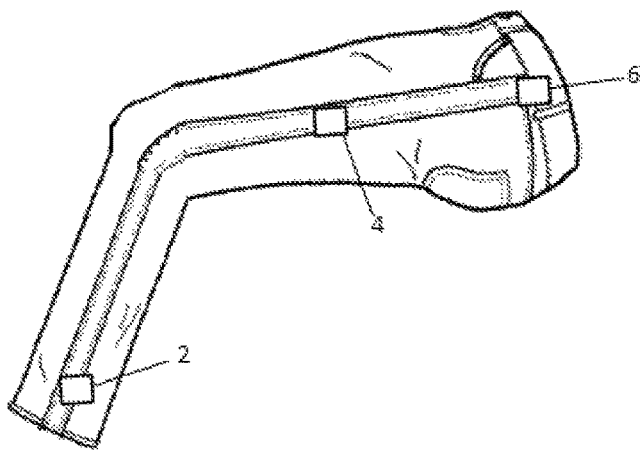

MONITORING ACTIVITY WITH INTELLIGENT FABRICS

RELATED APPLICATIONS

This patent application is a continuation-in-part of U.S. Pat. No. 9,330,558, which issued on May 3, 2016, entitled "Intelligent Fabrics", which is incorporated in its entirety herein. U.S. Pat. No. 9,330,558 claims the benefit of U.S. Provisional Application Ser. No. 62/047,684, filed Sep. 9, 2014, entitled "SMARTIE FABRICS", the entire provisional patent application of which is herein incorporated by reference.

BACKGROUND

Field of the Invention

The present invention is directed to textiles coupled with electrical components which interact with the wearer and the environment.

Description of the Related Art

Electronics are used to collect data relating to humans in a multitude of ways. Sensors are embedded in devices worn by humans to aid in collecting data. Many sensors are in wearable devices used to track fitness metrics of a human. For example, Nike and Ralph Lauren have developed products to track biometrics. Nike has created Nike+ which employs a sensor that can be embedded in a shoe, watch, or bracelet to collect data from human movement. Ralph Lauren has developed Polo Tech which uses silver fiber sensors woven into the shirt to keep track of the wearer's biometrics like heart rate and breathing rate. The shirt also delves a bit into the psychiatric realm by measuring stats like stress level. All this information is compiled in a "black box" on the shirt equipped with an accelerometer and gyroscope. Data captured in the "black box" is sent to the cloud, where a set of algorithms is used to analyze it. Once the information is parsed, you can access it live via a special mobile application.

Wearables usually involves a single sensor or single cluster of sensors for measuring one or more physiological signals. Wearables, such as the Ralph Lauren Polo Tech, rely on a pressure force between its sensors and the skin of the wearer. This force may cause irritation, reduce performance, cause unexpected problems and be unaesthetically pleasing. Wearable physiological measuring systems may have a tension adjusting device which can adjust a pressure force between a physiological sensor and the skin of the user according to different users, and thereby the physiological signal of the user can be correctly measured. A tension system of the wearable physiological measuring system can control a flexible binding force of the wearable physiological measuring system, however, when the wearable physiological measuring system is applied to a dynamic measurement, the tension system can create a noise or an abnormal signal skewing sensor output. Therefore, a dynamical stable apparatus that is comfortable is needed to accurately monitor motion.

Monitoring motion is not the only function textiles have. Although many wearable sensors are used to capture information relating to biometrics from activities, textiles are important to everyone. Textiles serve many functions, for example, protecting skin from harmful UV light and maintaining a core temperature. Also, textiles can be made to be personalized to the wearer. People wear different textiles depending on lifestyle, hobbies, jobs, etc. Using textiles, people signal and express things about themselves such as mood, hobbies, status, etc.

Digital or smart textiles describe combining textiles with information technology. This includes the incorporation of digital devices as part of the clothing. Moreover, it may be desired to know when an article of clothing has been closed, or whether a pocket is open or not. Therefore, a need exists for a method and system of providing interconnectability and control of sensors coupled to textiles which are wirelessly connected to networks.

SUMMARY

One embodiment of this invention is a method of alerting a user about one or more absent items is described where the steps include the collection of fabric data from one or more fabric sensors, where the sensors are positioned on a fabric. This fabric data from the fabric sensors is sent to a processor that compares the fabric data from the sensors to reference movement patterns stored in the memory that is connected to the processor. The processor then determines a type of movement when the fabric data closely resembles the reference movement patterns, and then compares the movement to prior movement patterns over time to determine if the fabric has transitioned from not being worn to being worn. If the fabric is now being worn, the processor transmits a message through a communication subsystem to the one or more items and alerts the user if a response is not received, because one or more of the items is missing.

This method of alerting a user about one or more absent items may also include a memory storage of the position and timestamp from one or more fabric sensors. The Fabric sensors could include an accelerometer and/or a temperature sensor. The communications could be over Bluetooth or NFC. The missing items could include a set of keys, a wallet, or a phone.

Another embodiment of this invention is a method of alerting a user that a phone has been forgotten where fabric data from one or more fabric sensors (where the sensors are attached to the fabric) is collected, said one or more fabric sensors incorporated into a fabric. This fabric data from the sensors is sent to a fabric processor that is connected to a fabric memory, where the fabric data is compared to reference fabric movement patterns stored in said fabric memory. The processor determines a fabric activity when the fabric data from the fabric sensors closely resembles said reference fabric movement patterns. The reference fabric movement patterns include a fabric pattern related to fabric sensor values found when the fabric is not being worn, and if the fabric is determined not to be worn, a message is transmitted through a communication subsystem to the phone, the message including data specifying that the fabric is not worn by said user. The phone the collects data from one or more phone sensors, and send the phone sensor data from the phone sensors to a phone processor. The phone processor than compares the phone data from the phone sensors to reference phone movement patterns stored in said phone memory, using this comparison to determine a phone activity when said phone data from the phone sensors closely resembles said reference phone movement patterns that indicates that the phone is stationary. Alerting the user if the fabric is not worn and the phone is stationary.

The method of alerting a user that a phone has been forgotten could use accelerometers or temperature sensors as the fabric sensors. The phone sensor could be an accelerometer. The communications subsystem could utilize a Bluetooth or a NFC protocol.

In another embodiment of this invention is an intelligent fabric for determining a state of a zipper which includes (1) a processor, (2) a memory connected to the processor, (3) a communications subsystem, connected to the processor for providing data access between the processor and a phone, (4) a sensor subsystem, connected to said processor for providing data related to the surrounding environment to the processor, said sensor subsystem comprising one or more sensors, (5) fabric mechanically connected to said processor, memory, communications subsystems, one or more sensors, and sensor subsystem, (6) reference movement patterns stored in said memory for comparing sensor data in order to determine movements, wherein the reference movement patterns include a pattern related to an unzipped zipper and the reference movement patterns further include a pattern related to the sensor values found when the fabric is being worn.

In one embodiment of the intelligent fabric for determining a state of a zipper the communications subsystem could incorporates a Bluetooth or a NFC protocol. The sensors could detect an open circuit and could be connected to a zipper. And it could include functionality for alerting a user when the fabric is worn and the zipper is unzipped.

Generally the present invention is directed to a practical as well as advantageous smart textile, hereinafter "Intelligent Fabrics." Intelligent Fabrics may include various electrical components, for example, a processor 201, memory 203, an accelerometer 240, a communications subsystem 230, a battery 222, a gyroscope 241, a barometer 212, a magnetometer 243, and additional components. It should be appreciated that a battery 222 may supply power to some, or all, of various electronic components of Intelligent Fabrics 200. Memory 203 may contain reference movement patterns against which a detected movement pattern may be compared to determine whether a detected movement pattern corresponds to an actual target movement. Memory 203 may also be used to store code executable by a processor 201. A communications subsystem 230 may be in communication with a secondary device or other sensor for transmitting and receiving various wired or wireless signals. Bluetooth 231, RF, NFC 232, and WiFi 233 are preferred modes for transmitting and receiving said wireless signals. Antennas can be woven into the fabric and connected to the communications subsystem for providing wireless communications to the Intelligent Fabrics Device.

In one embodiment, Intelligent Fabrics couples pants with four accelerometer subsystems 240 ("MEMS"). A MEMS is fixed in the textile proximal to the outside of: the left knee, the right knee, the bottom right pant leg, the bottom left pant leg. Each MEMS could be attached to a Intelligent Fabrics Device 200. Alternatively, each MEMS could comprise a three-axis accelerometer 240, a three-dimension gyroscope 241, a processor 201, memory 203, a Bluetooth communications system 230 and 231, and a battery 222. The sensors detect movement and relative location then output data based on timestamps to provide information to the user. Sensor identifiers can relay data based on the sensor position on the textile and the alignment of the sensor. The communications subsystem 230 sends data to a secondary device, the cloud, or a server. The data is then processed and compiled in a wearer readable format, such as an application on a phone or similar computing device. Time spent sitting, standing, fidgeting could be stored and displayed on the computing device. Number of steps taken and distance traveled could also be stored and displayed. The Intelligent Fabrics Device 200 can sync with a digital calendar to log information regarding the wardrobe of a wearer. The wearer can select any given day in the past on the calendar to view what was worn. The calendar can remind the wearer when laundry and dry cleaning needs to be performed, as well as, sync with the closet and hamper of the wearer to know what articles of clothing are clean and dirty.

Intelligent Fabrics may remedy the forgetfulness of a person by providing for wireless object detection. Sensors within clothing can interact with objects in the environment. Intelligent Fabrics may detect events and promotions likely associated with a wearer to signal promotions and other means of targeted advertising. In accordance with the present invention, Intelligent Fabrics are provided, which substantially increase the functionalities of traditional articles of clothing.

BRIEF DESCRIPTION OF THE DRAWINGS

For a more complete understanding of the present invention and its advantages, reference is now made to the following description taken in conjunction with the accompanying drawings.

FIG. 1A illustrates Intelligent Fabrics coupled to pants for determining that a person is sitting.

FIG. 1B illustrates Intelligent Fabrics coupled to pants for determining that a person is standing.

DETAILED DESCRIPTION

Figure 2:
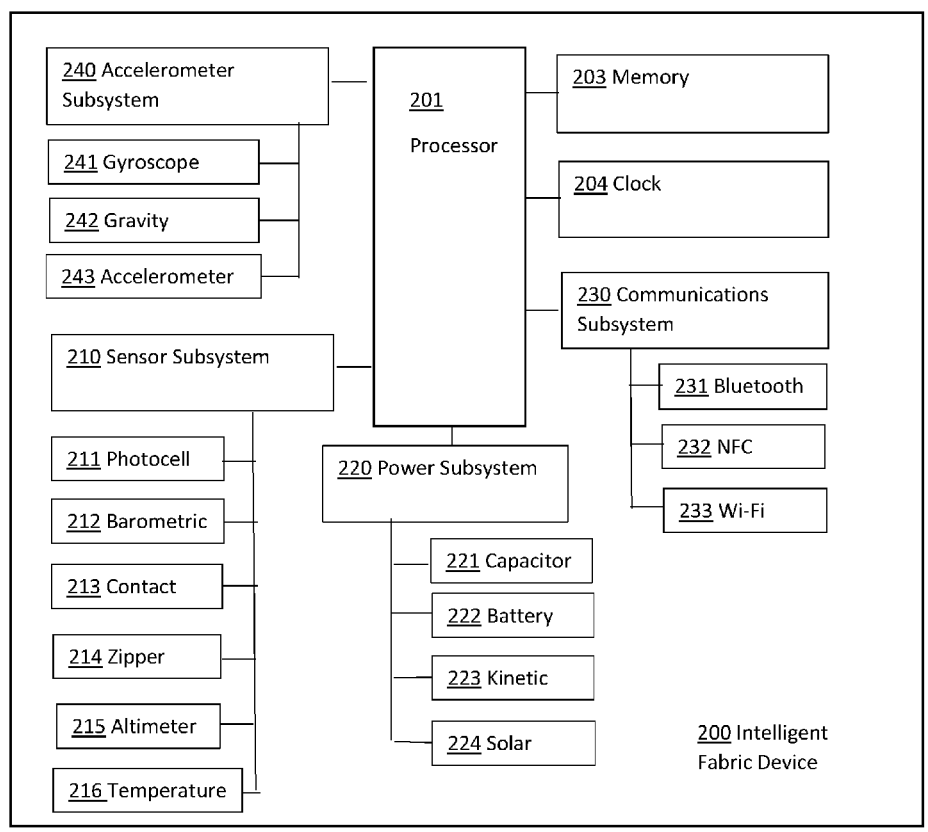
FIG. 2 is a simplified schematic drawing of an Intelligent Fabric Device.

Sensors coupled to textiles can create a system for determining positions and movements of a person. A plurality of sensors positioned throughout textiles creates a system that uses relative position to establish the locations of textile sensors. Such a system may be formed with identifiers on each sensor so that the position within a textile and the alignment of said sensor is described by such an identifier. In one embodiment, the sensor should be placed in a fixed position so that the identifier accurately reflects the position and alignment of the sensor. Typically, this is done by weaving the sensor into the cloth or by sewing the sensor to the fabric. In this embodiment, thin wires can be woven into the fabric to bring power to the sensors and to provide communications channels between the sensors and the processor. Alternately, fiber optic connections can be woven into the fabric.

In other embodiments, the sensor are moveable and capable of being transferred between different articles of clothing. This may be accomplished by having a sensor that is placed in a pocket or that is snapped to the fabric with a snap, a zipper, or attached with Velcro. In this case, the communications between the sensors could be wireless. This embodiment also lends itself to an aftermarket implementation, wherein other embodiments are woven into the fabrics.

The sensors are contained within the Intelligent Fabric itself and the output is processed in the same Intelligent Fabric or a secondary device such as a smart phone. These sensors can now be manufactured in a small enough package to incorporate into fabrics without the user noticing. In the cases where the size of the sensor is slightly larger, the sensor could be sewn into a seam, waistline, button, logo, or cuff. Examples of sensors may include one or more accelerometers 243, gyroscopes 241, magnetometers 242, barometers 212, altimeters 215, temperature 216, or other sensors coupled to textiles which produce outputs allowing movement to be inferred. An accelerometer 243 may sense the direction of gravity and any other linear force experienced by the accelerometer 243. A gyroscope 241 may measure a Coriolis Effect, heading changes, and rotation. A barometric pressure sensor 212 may measure atmospheric pressure. An altimeter 215 may measure a change in elevation. A temperature sensor 216 could check for the temperature of the surroundings and determine if the clothes were being worn. It should be understood, however, that these are merely examples of sensors that may be used in particular implementations, and claimed subject matter is not limited in this respect.

An accelerometer 243 coupled with a gyroscope 241 provide six-dimensions of observability (x, y, z, τ, φ, ψ). An accelerometer 243 may sense linear motion such as the translation in a plane. Thus, with a single accelerometer, an object's motion in Cartesian coordinate space (x, y, z) can be sensed, and the direction of gravity can be sensed to estimate the object's roll (τ) and pitch (φ). Since accelerometers may not be able to easily differentiate between the object's linear motion and tilt, a gyroscope 241 may be used to measure the rotation about (x, y, z) coordinates, that is, roll (τ) and pitch (Ω) and yaw (ψ), sometimes referred to as azimuth or heading.

An accelerometer 243 may measure linear movement in six-directions with reference to Cartesian coordinates (x, y, z). These six-directions fall on three lines spaced ninety degrees from each other while intersecting a single origin (+x, −x, +y, −y, +z, −z). A one-dimensional accelerometer may provide measurements to indicate linear movement along a single line in two-directions (+x, −x). A two-dimensional accelerometer may provide measurements to indicate linear movement in a plane along both x-dimension and y-dimension, and a three-dimensional accelerometer may provide measurements to indicate linear movement in three-dimensional space along x, y and z-dimensions. A three-dimensional accelerometer may comprise a two-dimensional accelerometer combined with a one-dimensional accelerometer, or may comprise three one-dimensional accelerometers. An accelerometer may provide measurements in terms of linear acceleration (e.g. m/sec$^2$), linear velocity (e.g., m/sec), or linear distance (e.g., m). A non-Cartesian coordinate system can be used such as a coordinate system for the Intelligent Fabrics. In specific implementations, a coordinate system may define dimensions that are mutually orthogonal.

Rotational movement from a gyroscope 241 may be represented by the coordinate system (τ, φ, ψ). Tau (τ) represents yaw or rotation about the z-dimension, phi (φ) represents roll or rotation about the x-dimension, and psi (ψ) represents pitch or rotation about the y-dimension. In one implementation, a gyroscope may comprise a one-dimensional gyroscope to provide measurements indicating rotational movement about a first dimension. In another implementation, a gyroscope may comprise a two-dimensional gyroscope to provide measurements indicating rotational movement about a first dimension and a second dimension. Likewise, in another implementation, a gyroscope may comprise a three-dimensional gyroscope to provide measurements indicating rotational movement about first, second and third dimensions. A three-dimensional gyroscope may comprise a two-dimensional gyroscope combined with a one-dimensional gyroscope, or may comprise three one-dimensional gyroscopes. The gyroscope may provide measurements in terms of angular acceleration (e.g., rad/sec$^2$), angular velocity (e.g., rad/sec), or an angle (e.g., rad).

A single accelerometer 243 may sense linear movement while a single gyroscope 241 may measure angular movement such as a tilt or roll. Interfacing an accelerometer 243 with a gyroscope 241 in a textile, such as a shirt, may be used to sense linear movement as well as angular movement. For example, a three-dimensional accelerometer 243 and a three-dimensional gyroscope 241 provide six dimensions of observability (x, y, x, τ, φ, ψ). Fewer dimensions may be desired to sense fewer dimensions of linear and rotational motion. For example, a two-dimensional accelerometer and a two-dimensional gyroscope may provide four dimensions of observability (x, y, τ, φ). Techniques described herein may implement a single-sensor or a multi-sensor Intelligent Fabric Device 200 for measuring one or more dimensions. The gyroscope 241 is optional.

Standing vs. Sitting

By aligning an accelerometer sensor 243 in a textile near a skeletal pivot point the angle of a body part can be used to relay posture information. Accelerometer sensors 243 may be preset in positions to determine relative movements from a set orientation using an associated identifier. An accelerometer sensor 243 that is placed in a pant leg above the knee will change orientations by approximately ninety degrees when a person sits versus stands. This is because the angle of the thigh moves from an upward position from standing to a sideways position when sitting.

The orientation may also be determined from one sensor to another by the relative position of both sensors. The method of determining position can be seen in a paper titled "Bluetooth Indoor Localization System" by researchers at Humboldt University Berlin where they describe a localization system which estimates distance to an accuracy of 1 meter by measuring the difference between signal emission and time of arrival. Alternatively, location could be determined using received signal strength (RSSI).

In one embodiment, a bottom sensor 2 near the outer left leg of a pair of pants may communicate with a top sensor 6 near the left side of a waistband of the same pants. When a person is standing, the sensors will be oriented so that the sensor in the left side of a waist band is approximately directly above the sensor in the bottom outer left leg of a pair of pants. When a person is sitting, the sensor 2 in the bottom outer left leg of a pair of pants will be in a forward-position from the sensor 6 in the left side of a waist band. Alternatively, the sensor 2 in the bottom of the pants will be closer to the sensor 6 in the waist band of the pants when the person is sitting down compared to standing. This could be accomplished by using RSSI or Time of Flight methods described above.

In another embodiment, a middle sensor 4 is downwardly aligned in the thigh area of the pants. When the person is standing the middle sensor 4 is aligned towards the ground. When the person is sitting the middle sensor 4 is aligned approximately 90 degrees from the standing position. In one embodiment, the Intelligent Fabric includes a gravity sensor 242 (often these are included in the accelerometer) and an accelerometer 243 to comprise the middle sensor 4 in the thigh portion of pants to determine whether a person is sitting or standing. With the sensor above the knee, if gravity is detected along the length of the leg, then the person is standing. If gravity is detected perpendicular to the leg, then the person is sitting.

The positioning and alignment of the sensors allows for connectivity between the sensors to determine angles and distances. Connectivity may determine angles and distances by using received signal strength (RSS), time of arrival (TOA), time difference of arrival (TDOA), or the like. RSS signal measurement may be best for most applications because of the low hardware cost. However, RSS are not typically as accurate as TOA and TDOA methods. The decreasing cost and size of sensors allows for distance estimation methods with good accuracies at a low cost.

FIG. 1A illustrates the Intelligent Fabrics coupled to pants for determining that a person is sitting.

FIG. 1B illustrates the Intelligent Fabrics coupled to pants for determining that a person is standing.

A sensor 2 attached to the end of each pant leg can allow for signature foot position recognitions for each user. A user may have a specific positioning of the feet depending on whether they are sitting or standing. When a user is standing they may have each leg slightly angled outward. The sensors 2 can then pick up on this outward angle by communicating with each other or another device and determining distance using RSSI or Time of Flight algorithms. Then when the same user is sitting they may have each leg pointed straight ahead. The sensors 2 may be pinged at a time interval to determine the different orientations of the sensors.

These orientations may be logged to keep track of the time a user spends standing or sitting. A database could be incorporated in the Intelligent Fabrics Device (or each reading could be uploaded to a server) to log a timestamp and the sensor values. This database could be updated periodically or only when a change of position is detected from the sensors.

Instead of pinging the sensors at a time interval, the sensors may be used to detect when a change occurs in orientation to determine that the user has moved from a sitting to a standing position. The sensors may wirelessly alert another device or server of the change in orientation so that the time sitting and standing can be appropriately recorded.

Pedometer

A sensor 2 may be placed on the bottom of each pant leg so that the distance taken with every stride can be recorded from the relative distance from the two sensors. By taking the aggregate of the stride lengths the total distance of a user wearing the pants can be recorded. The stride length will differ depending on if the user if walking or running. A user that is walking will most likely not start his next stride at exactly the same point where the user's foot last touched the surface. Whereas a user that is running will likely start the next stride closer to where the user's foot last touched the surface. Additionally, the distance from the tags to the ground may be extrapolated to determine a more accurate stride length.

Measuring the total distance of every stride taken by a user may reduce the battery life of the system, which can be resolved if the distances were not measured at time intervals. Measuring the stride distance at a time interval then multiplying the measured stride distance over the number of strides that are taken during that time interval will yield the approximate distance a user has traveled. To say it another way, measuring the stride distance at certain time intervals then multiplying the resultant average stride distance by the number of strides that were taken during a travel interval proximate to such stride-length estimating interval will yield the approximate distance a user has traveled during that travel interval. The time (or travel) intervals, which can incorporate the stride-length estimating intervals, can then be added for any given period to give the approximate total distance for that period.

In some embodiments an accelerometer 243 may be used to determine the number of strides taken. Intelligent Fabric Devices 200 may use accelerometers 243 and processors 201 to determine the number of strides taken. The accelerometer 243 measures the acceleration in the direction vertical to a person's body created by a stride when the foot contacts the ground. In other words, it measures the foot leaving the ground and returning to the ground. Each contact creates an acceleration peak. For each contact that creates acceleration above a set threshold, a stride is recorded. A comparator within the processor 201 determines when the threshold is met.

The Device 200 processes the vertical acceleration from an accelerometer 243 and compares the sensed value with a reference threshold. The reference threshold value represents the amplitude at which the acceleration signal represents a step. The reference threshold is lowered and raised in accordance with the sensed acceleration magnitude. The reference threshold could be a function of the apparent speed of the user. Acceleration magnitude is dependent upon the types of shoes worn, the type of terrain, the speed of movement, and the like. Multiplying an average stride length by the number of times the threshold acceleration magnitude was met or surpassed yields the distance traveled.

In one embodiment, the Device 200 processes the vertical acceleration of the accelerometer 243 to count the steps based on a threshold acceleration. The process requires the value of a reference acceleration threshold to be met. The reference acceleration threshold is met when the acceleration magnitude exceeds the reference acceleration threshold and then drops below the reference acceleration threshold. The Device 200 then processes the distance between the sensor in the right leg with the sensor in the left leg using RSS, TOA, TDOA, or a similar method at the time the reference acceleration threshold is met. The distance between the sensors is extrapolated as to represent the point at which the foot contacts the terrain to estimate the exact length of the stride. The distance value is stored in the Device 200 or a secondary device receiving the data from the Device 200. Distance values are added to reflect the total distance traveled over a period of time. This embodiment provides a more accurate distance traveled measurement than other systems because a fixed stride length is not used. Calculating the distance of each individual stride, or measuring the actual stride length at sample intervals, allows for a more accurate total distance as compared to a traditional pedometer, which typically just measure steps-taken, or miles traveled via GPS readings.

This invention improves on that methodology as it can produce highly accurate distance-traveled measurements when GPS signals are not available or not accurate enough to capture motions of just a few feet. Traditional pedometers when worn on the wrist also often confuse hand and arm motion not associated with walking (raking leaves, for instance) with walking-produced arm motions. This confusion inflates the steps-taken measurement and thus the distance traveled metric. If this invention were combined with a traditional pedometer, however, steps-taken could be measured with a new systems, while the traditional pedometer could be used to track arm and produce a new category of exercise to track—"arm motion exercise".

Fidgeting

Sitting still for long periods of time is dangerous to human health. The more a person sits the more of what the person consumes will be stored as fat. Excess fat predisposes the human body to further health problems including diabetes and heart disease. Sitting for long periods of times drops the production of the blood enzyme lipase which is responsible for breaking down lipids. The electrical activity of the body also decreases which may decrease the metabolic rates over time. Furthermore, sitting still for long periods of time, such as on a long airplane flight, can cause deep vein thrombosis (DVT), potentially deadly blood clots that form in the legs and can migrate to the heart or brain. By fidgeting, that is, making repetitive and often rapid motions with your arms, legs, or feet while you sit some of these risks are reduced.

Some Intelligent Fabrics sensors merely detect that motion has occurred. One solution declares motion when a signal exceeds a threshold during an observation period. A disadvantage of such a method is that it may indicate motion even if a measured signal is incidental when in fact motion did not occur. Accordingly, one implementation may therefore provide a method and system for detecting and evaluating movement and may result in more efficient power consumption as there may not be a need to use power to transmit signals in the event that a determination is made that a sensor has remained in a substantially stationary position. For example, incidental movement may be distinguished from a threshold movement based on a movement pattern observed from one or more sensor measurements exceeding threshold values. One implementation may identify patterns in sensor fabric data characteristic of a fidgeting user, and differentiable from a moving user.

Accelerometers 243 interfacing with gyroscopes 241 in the fabric of clothes may monitor the fidgeting of a user while they are sitting. Device 200 will determine how much movement occurred. The electrical components are placed in a fixed position on the Intelligent Fabrics so that the orientation for received accelerations is known. Whether the user is working on a computer all day or sitting down working in a factory, the small movements may be tracked by the accelerometers 243. Device 200 may also compute the difference in relative position to other sensors or connected devices for the purpose of reaching a fidgeting metric for the user. A fidgeting metric may be established for each piece of clothing or for all of the pieces of clothing in combination. A shirt may give the user a metric for how much upper body fidgeting occurred where pants may output a metric for how much lower body fidgeting occurred. Each piece of clothing may put together a calorie count based on the movements for a time interval to determine the number of calories burned by a region in the body. A secondary device may then compile the total fidgeting metric and calorie score for the user. In one embodiment, a single accelerometer could be used to determine movement of the fabric, corresponding to movement of the user. In multi-sensor embodiments, the distance between the sensors could be used in addition to accelerometer movement to determine the amount of movement. Often, the amount of fidgeting is an analog value relating to the amount of movement in a period of time.

In one embodiment, a method and associated apparatus are provided for determining whether an Intelligent Fabric has moved in a fidgeting manner. A fidgeting manner is detected by a pattern of movement in the Intelligent Fabrics based upon output from one or more sensors. For example, sensor outputs, as seen by the accelerometer 243 or the gyroscope 241 from one or more sensors which exceed a preset threshold value may define a fidgeting manner via a pattern of movement. For example, an accelerometer 243 output of acceleration exceeding a threshold value and an output of rotation exceeding a threshold value may define a pattern of movement. Another example of a movement pattern includes a sequence of acceleration peaks during some time interval, or spectral frequency characteristics, such as high incidence of peaks around specific frequencies such as 60 Hz. In one embodiment, the memory 203 contains a database of reference movement patterns. The sensor fabric data is compared to this database to find a match. The matching is not done with an exact comparison, but by using expert systems interpretation to find a data set in the reference movement patterns that closely resembles the sensor fabric data. In one example, the x, y, and z values from an accelerometer are subtracted from the reference movement pattern for x, y, and z, and the absolute value of the differences are summed. The sum is then compared to a tolerance value in the reference movement pattern. If the sum is less than the tolerance value, then the pattern matches, otherwise it does not match.

Output from sensors may determine whether an Intelligent Fabric has been moved in a fidgeting manner. In one embodiment, movement of an Intelligent Fabric may be detected from movement of a center of mass respective to a body part. Example body parts in which the center of mass may be calculated include: right foot, left foot, right shank, left shank, right thigh, left thigh, right hand, left hand, right forearm, left forearm, right upper arm, left upper arm, head, neck, trunk, or the like. A fidgeting manner may be determined based on measurements from one or more sensors contained in Intelligent Fabrics. In one implementation, a fidgeting manner may be determined upon receipt of two or more measurements exceeding predetermined threshold values within a set time interval. For example, such measurements may be received from a gyroscope 241 and an accelerometer 243 located in an Intelligent Fabric Device 200 near the ankle.

Patterns of predefined movement may allow a determination of whether a detected level of movement corresponds to a predetermined level of movement. If a detected movement pattern corresponds to a predetermined level of movement, a determination may be made that the person is in a fidgeting state. On the other hand, if a detected movement pattern does not correspond to a predetermined level of movement, a determination may be made that the person is in a stationary state. In determining whether a movement pattern corresponds to a predetermined level of movement, one or more sensor measurements may be compared against threshold values.

Accelerometers 243 contained in the Device 200 coupled to textiles output different values for a stationary wearer as compared to a wearer moving at a constant rate of speed. Accelerations of greater magnitude are associated to a moving wearer with outputs exhibiting relatively high spikes in acceleration at a relatively high frequency. A wearer that is absolutely still, such as a wearer napping on a couch, may show little to no spikes in acceleration. Depending on the placement of a sensor, various accelerations may be detected. By processing fabric data from the sensors closest to fidgeting body parts, a secondary device can determine the time spent fidgeting. An acceleration profile for a fidgeting wearer may tend to have acceleration spikes at a higher frequency than those of a wearer in a relatively stationary position.

Posture

In another embodiment, the Intelligent Fabric could be used to detect the user's posture and notify the user when his posture needs correcting. The notification could be done at the time that bad posture is detected or it could be aggregated and reported to the user at the end of the day. Sensors in the fabric of a shirt could be checked for their position to see if they are lined up correctly, and if not, then a bad posture determination is made. This is used to detect a slumping back. The determination of whether the user is standing or sitting could be used in conjunction with this determination, to specify if the bad posture occurs when standing or sitting.

In another embodiment, an Intelligent Fabrics sensor could determine the angle of the user's head to determine if were held high or bent down (for instance, looking at a cell phone, which if done too continuously, can cause neck pain and a slumped posture). This angle is determined by locating a sensor on the head of the user, perhaps built into a barrette or a hair tie that held together a pony-tail, one or more earrings, or a pair of glasses. Such sensors could have in them accelerometers as well as the normal means of communicating and staying charged. The user could calibrate the sensor by indicating, perhaps verbally to a cellphone app, when their head was being in the correct position. Assuming the hair band, for instance, is not moved, later head-angles could be compared to the earlier calibrated correct angle to determine the amount of time the head was held slumped down versus in a more correct posture.

Alternatively, the sensor could contain a Bluetooth chip with a directional antenna (see U.S. Pat. No. 9,118,116B2 by John T. Apostolos et al, hereby incorporated by reference) and work in conjunction with a sensor in a shirt or blouse that was affixed in a known location. The antenna could tell the direction of the signals from one or more other sensors, and determine the angle in which they arrive. This angle information is then transmitted to the Intelligent Fabrics processor where it is assembled in to an array of angles. This angle information array is then processed to determine the position of the other sensors and whether they line up in a pattern that reflects proper posture. This information can be transferred to a smart phone, computer, tablet, or other user interface device. Such a directional antenna approach may also require calibration if the location and angle of the hair-affixed sensor was not initially known.

A further embodiment would involve placing a sensor in the collar of a shirt. Such could measure the spacing between the collar, preferably the top of the collar, with the neck itself. When a person leans their head forward this space increases and can be noted by the sensor. Such a sensor could be capacitive in nature, noting the change in the capacitive field when the neck moves away from the sensor.

Neck posture could also be measured with a pressure sensor placed in the collar, or just below the collar, where there would be contact with the shoulders. When the user leans their head forward, or slumps their shoulders (another bad habit), such a sensor would register a decrease in pressure. The system could collect and report such pressure readings collected over the course of the day.

Another Intelligent Fabrics embodiment would place an accelerometer-based sensor in a belt such that the sensor was located at the small of a user's back. Alternatively, such a sensor could be embedded in a similar location in the pants themselves. Such a sensor could be calibrated, as noted above, to note when the wearer was standing up straight. When the user leaned forward, the angle of the belt, and thus the sensor, will subtly tilt forward as well.

Posture readings could be interpreted by the system in light of what activity the user was engaged in at the time. For instance, if the user were texting while the slumping forward their head, this would be noted as negative scenario. If the phone was not being used in such a manner, yet a smart watch detected arm motion akin to doing the dishes, the system might presume that the user was washing dishes, an activity that often requires such forward-leaning posture.

Sensing Hardware

Intelligent Fabric sensors as described herein may enable applications depending on the compatibility of sensors integrated into a wireless device. Some applications may employ more than one output from at least one sensor and may employ multiple degrees of observability from a sensor. The ability to sense is dependent on the hardware used by Intelligent Fabrics. The Device 200 provide most of the hardware for Intelligent Fabrics because of the small size and low power usage of the systems. The small size allows the Device 200 to easily and comfortably fit into an article of clothing. The small size is important for applications in which the Device 200 sensors would like to be hidden. For instance, Intelligent Fabrics may employ a Device 200 to relay critical medical information to a secondary device. The wearer may want to keep their medical condition discrete and therefore having the Device 200 hidden in their clothing could accomplish that.

FIG. 2 shows a simplified schematic of an Intelligent Fabric Device 200. The Device 200 contains a processor 201 electronically interconnected with memory 203 and a clock 204. Processor 201 is also connected to an accelerometer subsystem 240, a sensor subsystem 210, a power subsystem 220 and a communications subsystem 230.

The accelerometer subsystem 240 in this embodiment includes an accelerometer 243, a magnetometer 242, and a gyroscope 241 which output to a processor 201 to be sent and received wirelessly through the method mentioned herein. The accelerometer 243 and gyroscope 241 output six-dimensions of observability (x, y, z, $\tau$, $\varphi$, $\psi$). Each of the accelerometer 243, the magnetometer 242 and the gyroscope 241 are optional and may not be present in certain embodiments. In another embodiment the accelerometer 243, the magnetometer 242 and the gyroscope 241 could be directly connected to the processor 201.

The Sensor subsystem 210 could contain one or more of the following sensors: photo cell 211, barometric pressure 212, contact 213, zipper 214, temperature 216, and/or an altimeter 215. A photo cell 211 could be used for determining how much light (visible, ultraviolet, infra-red) has arrived at the fabric. A barometric pressure sensor 212 could be used to determine the weather. A contact sensor 213 could be used to determine whether a button is buttoned or whether a belt is inside or outside of a belt loop. A zipper sensor 214 could determine if a zipper is up or down. A temperature sensor could detect body heat. An altimeter 215 could determine altitude. These sensors 211-215 could be directly connected to the processor 201 in one embodiment. In another embodiment, any of these sensors 211-215 and the accelerometer subsystem 240 devices could be located remotely from the processor 201 and connected wirelessly or with a wire to the processor 201.

The power subsystem 220 provides power for the processor 201, the clock 204, the memory 203, the accelerometer subsystem 240 and the communications subsystem 230. The power subsystem 220 could provide power from one or more of a capacitor 221, a battery 222, a kinetic power generating source 223 or a solar cell 224.

The Device 200 through the processor 201 communicates with the internet and with other devices through the communications subsystem 230. The communications subsystem 230 could use any number of wireless communications technologies, such as Bluetooth 231, Near Field Communications 232, RFID, or WiFi 233. A cellular network could also be used.

The hardware used in the Intelligent Fabrics may combine multiple sensing functions at a single sensor location or node. For example, Intelligent Fabrics Device 200 may include a six-axis accelerometer 243 which includes a magnetometer 242 and temperature sensor. In a specific instance, the Kionix KMX61G interfaces could implement the Accelerometer subsystem 240 with a Texas Instruments CC2541 Bluetooth transmitter (implementing the processor 201, the memory 203, the clock 204, Bluetooth 231 and the communications subsystem 230) and is coupled to Intelligent Fabrics Device 200. The KMX61G is a high-performance, low-power, magnetometer-accelerometer device enhanced with integrated sensor fusion software and auto-calibration algorithms to deliver accurate outputs at low powers. In standby, only 5 µA of power is used. Using the accelerometer only, 150 µA of power is used. Operating the accelerometer and magnetometer requires only 550 µA of power. The dimensions of the magnetometer-accelerometer is 3×3×0.9 mm, taking up little space on the Intelligent Fabrics Device 200. The accelerometer range can be changed from ±2 g, 4 g, and 8 g. The magnetometer can measure from ±300 µT to ±1200 µT. The KMX61G has wake-up and back-to-sleep functions for greater power saving functions along with a programmable interrupt engine and accelerometer self-test function. The sensor can auto-calibrate using built in algorithms to provide a more accurate digital output. The digital output transmits to the Texas Instruments CC2541. The CC2541 is a power-optimized solution for both Bluetooth low energy and 2.4-GHz applications. It enables robust network nodes to be built at a low cost for Intelligent Fabrics. Each sensor or network node is programmed to communicate with the sensors on the same article of clothing. A secondary device, such as a smart phone, can execute functions across articles of clothing containing the Intelligent Fabrics. The CC2541 combines the industry-standard enhanced 8051 MCU 201, in-system programmable flash memory with 8-KB of RAM 203 allowing for data transfer rates up to 2-Mbps.

The various Intelligent Fabrics procedures described herein may be implemented with hardware or software, or a combination of both. For example, dedicated hardware logic components can be constructed to implement at least a portion of one or more of the Device 200 functions described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, parallel processing, and virtual/cloud processing.

Fabric Synchronization

Each fabric will have a sensor or sensors associated with it that are embedded, attached, or otherwise coupled to the fabric. A pair of socks may have one sensor in each sock, a pair of pants may have four sensors, and a shirt may have six sensors. When the user puts on the socks, pants, and shirt all twelve of the sensors may synchronize with each other. The software on a secondary device can then choose the optimal method of reading the sensors worn by the user. Depending on the output requested by the user it may be more efficient to bypass specific sensors and link sensors from one article of clothing to another. Energy savings will occur by using fewer sensors for operations that require only basic operations amongst the sensors. A user may be wearing multiple articles containing Intelligent Fabrics Device 200 and the use of all of the worn sensors would be redundant. Intelligent Fabrics 200 has a hierarchy of what sensors should remain active depending on what articles are worn stored in the Device memory 203. For example, if a user is wearing pants, a shirt, and a belt that all contain Intelligent Fabrics, the sensors 213 in the belt may remain active if it is atop the hierarchy. The sensors 213 in the belt may remain active instead of the sensors in the shirt and pants because the belt is also a battery and has the greatest initial battery life. However, although the belt has the greatest battery life the shirt or pants may remain active if the current battery life of the belt is less than that of the shirt or pants. Sensors could be incorporated into buttons, logos, or tags (such as those sewn into the neck of shirts or beltline of pants).

In one embodiment, a wearer puts on a dress shirt and a tie, both the dress shirt and tie employ Intelligent Fabrics Devices 200. The dress shirt contains a Device 200 coupled to the textile in the center of the dress shirt below the middle button. The tie contains a Device 200 coupled to the back center portion of the tie. Near field communication ("NFC") 232 establishes a connection between the tie and dress shirt when the said Device 200 are within a set distance of each other. Data is exchanged over a radio frequency ISM band of 13.56 Mhz. The NFC protocol allows the tie and dress shirt to automatically sync in less than a tenth of a second when the Device 200 are within a predetermined distance. For this application, the NFC Chips 232 should be within one cm of each other to operate. This small distance is used so that the connection is broken between the tie and the dress shirt when they are more than one cm apart. Now the wearer can be notified that the tie is not on straight when the NFC connection is broken. The NFC protocol may also be desirable for communicating with textiles worn by another user that is within range of the wearer.

NFC provides automatic connections between Intelligent Fabrics which allows the sensors to properly and quickly sync. The NFC protocol distinguishes between an initiator and a target of the communication. Every Device 200 employed in Intelligent Fabrics that use the NFC protocol should be a target. However, it may only be necessary for a single Device 200 employed Intelligent Fabrics to be an initiator. The initiator may be the MEMS that initiates the sync and controls the exchange of data between Devices 200. The target may be the device that answers the request from the initiator. The NFC protocol also may distinguish between two modes of operation, namely, an active mode and a passive mode. NFC compliant devices may support both communication modes. In the active mode of communication, the initiator and target devices may generate their own RF field to carry the data. In the passive mode of communication, only one device may generate the RF field while the other device uses load modulation to transfer the data. The NFC protocol specifies that the initiator is the device responsible to generate the RF field.

Another important feature of this protocol may be the support for the passive mode of communication. This is very important for battery-powered devices since they may place conservation of the energy as the first priority. This mode does not require both devices to generate the RF field and allows the complete communication to be powered from one side only. Of course, the device itself will still need to be powered internally but it may not have to "waste" the battery 222 on powering the RF communication interface. Also, the protocol may be used easily in conjunction with other protocols to select devices and automate connection set-up. For example, NFC 232 can be used to setup a Bluetooth 231 or Internet connection with another device. The parameters of other wireless protocols may be exchanged allowing for automated set-up of other connections. This simplifies the difficulty in using longer-range protocols like Bluetooth 231 or Internet in selecting the correct device out of the multitude of devices in the range and providing the right parameters for the connection.

In another embodiment, the sensors could be connected by wire woven into the fabric. Thin wires could be sewn into the fabric and connect directly to the sensors. Sets of wires could be woven into patches of power that could be used to provide interfaces to other pieces of clothing. For instance, a shirt could have a three inch by three inch patch on each side that would provide a positive and negative contact for the shirt. The pants could similarly have a three by three patch on the inside of the waist area, so when the shirt is tucked in, the shirt and the pants can be electrically connected. A belt may be similarly connected to the pants. With a shirt or a jacket, there could also be wire patches on the inside of the shoulders to allow the Intelligent Fabrics device to be connected to the hangers when the shirt or jacket is in storage.

In accordance with an embodiment of the invention, the integration of NFC 232, Bluetooth 231 and RF transmission and/or reception may be integrated onto a single chip. The size of a wireless system may be greatly reduced if the radio functions for these protocols are integrated onto a single chip. The integration of an NFC 232 system with Bluetooth 231 functionality may allow the Device 200 to easily couple with textiles because of the small chips size and efficient power usage.

Calendar Synchronization

A person may wish to manage a wardrobe so that a person can keep track of the clothes worn to different functions. The person may want to plan the clothes to be worn at future meetings and functions. A person may be concerned with their appearance in not repeating clothing worn to meetings and functions that are sequential or otherwise related by attendance of the same people, therefore, may wish to synchronize Intelligent Fabrics Devices 200 with a user's Calendar, such as Google Calendar. A database would store information about each article of clothing incorporating such Intelligent Fabric Devices 200 and its prior usage. Identifiers with descriptions of the articles of clothing worn, timestamps of times worn, notations about the functions attended, and information regarding persons attending such functions would be provided in the database. Thereafter, in planning clothing to be worn to future gatherings, the history of use information can be reviewed to avoid wearing the same garments too often to related functions, or too frequently or consecutively in front of the same people.

An NFC system 232 can be employed in a closet to track what articles of clothing are worn and when by communicating with the cloud, a secondary device, or a computer. By transmitting the timestamp and identifiers found on the articles of clothing to the cloud, a secondary device, or a computer, a person can carefully track what is worn and when. This fabric data may be transmitted and recorded by an NFC system 232 in the closet that uploads the data to the internet. The uploaded fabric data containing the timestamp and associated articles of clothing can then be synchronized with a calendar. The calendar can organize this data so a person does not wear the same articles of clothing around the same group of people in a given time interval. For example, a person could have a meeting every Tuesday and Thursday with coworkers. On Tuesday, a blue dress shirt and gray slacks were worn. On Thursday, the person puts on a blue dress shirt and gray slacks again. When the NFC 232 transmits the fabric data to be synchronized with the calendar, a warning email/text/SMS may be sent to the person notifying them that the same clothes were worn on Tuesday.

The clothing needs to make the determination whether it is worn or simply being moved. There are two methods that are contemplated, that could be used independently or in conjunction. The first is to incorporate a temperature sensor that detects if the clothing is in contact with a human. The temperature sensor checks for a range of 96-103 degrees F. for five seconds or more on the inside (towards the user's skin) of the fabric. If the temperature is in this range, then the clothes are determined to be worn. If more accuracy is needed, two temperature sensors could be used, one inside and one on the outside. The difference between the temperature sensor readings would indicate whether the fabric was being worn. This would alleviate inaccuracies dues to the clothing being worn at extreme temperatures.

The second method is to track movement with an accelerometer. If the accelerometer sees that the clothing is vertical and moving with a gait, then the clothes are determined to be worn. In essence, the sensor data is compared to a reference movement pattern known to be that occurring when the fabric is worn.

The person can change settings in the Calendar to notify them on a more strict or lenient basis. On a lenient basis, the Calendar may notify the person only if the exact same clothes are worn at a similar event within three days. On a strict basis, the Calendar may notify the person if similar clothes are worn at a similar event within two weeks.

NFC 232 is not the only protocol that can be used to sync what is taken from the closet with the Calendar. RFID tags, Bluetooth 231, a wired sensor protocol, and Wireless Ethernet 233 may readily track what is worn and when. Further, the Calendar may not be synced at the time clothes are taken from the closet. A secondary device, such as a smart phone, may communicate with Intelligent Fabrics 200 to record the fabric data containing the timestamps and worn clothes. The secondary device can then sync the data with the Calendar. For instance, if the secondary device is a smart phone, the smart phone can use Bluetooth 231 to pair with the Smart Fabrics 200 and sync the above data with the Calendar.

In addition to the coordination of clothes with the calendar, the smart clothes could help the wearer to coordinate an outfit. Inside of the tag (NFC or otherwise), could be stored information regarding the type and color of the piece of clothing. A smart phone, the cloud, or another device could collect the information on all of the items of clothing that are being worn, and then run this through a fashion app to determine if the clothing items go together. For instance, if a brown pair of pants is being worn, Intelligent Fabrics Devices 200 system would notify the user of a fashion violation if he is also wearing a non-matching blue tie, with each item of said clothing incorporating the Intelligent Fabrics technology and using sensors to determine that such clothing is being put on and worn. Such analysis could be done locally by one or more of the intelligent sensors, or by communicating to a connected phone, or by communicating to the cloud.

The fashion app could also make recommendations of what items in the closet to wear with that brown pair of pants, perhaps suggesting a tan tie. This recommendation part of the fashion app could also check the weather and make suggestions on the expected weather. For instance, it could recommend rubber soled shoes rather than leather if rain is forecast.

Timestamp Positioning with Stationary Sensors

The Intelligent Fabrics 200 could be used to monitor where someone is and could be used to limit access to locations based on the presence of Intelligent Fabrics 200 devices. See US Patent Publication 2016-006378, Methods, Software, and Systems for Providing Policy-Based Access, incorporated herein by reference. The Intelligent Fabrics 200 could also be used to ensure that safety equipment, incorporating Intelligent Fabrics, is being worn, as described in U.S. patent application Ser. No. 14/982,217, Travel Safety Control, incorporated herein by reference. Devices and servers receive the timestamps and positions of Intelligent Fabrics 200 and process them. Along with receiving timestamps and positions the devices and servers recognize stationary sensors. The stationary sensors are represented from compiling data across Intelligent Fabrics 200 within an environment. The devices and servers combine fabric data from Intelligent Fabrics 200 with the data from the determined stationary sensors to provide an associated position of sensors in the environment with the respective error for each stationary sensor.

In some embodiments, the device and server represent a cloud network position determination system involving a group of Intelligent Fabrics Devices 200. The device and server each have at least one processor 201, a GPS, and memory 203. The memory 201 stores, among other data, positions and timestamps from the Intelligent Fabrics 200. Each of the positions represents detection by a device or server of a sensor at a particular time. The positions are then grouped by timestamp for determining position information of interest. Timestamps associated with the position of moving sensors are compared to the timestamps associated with the position of stationary sensors. The mesh or cloud network determines the presence of a stationary sensor from overlap of positions from closely related timestamp intervals of different groups.

UV Sensor

Sunlight can cause long-term damage, such as premature skin aging and skin cancer. Most of the skin cancers are associated with exposure to ultraviolet radiation. Millions of people are diagnosed with skin cancer each year. Some groups of people have an increased risk of skin cancer. Groups of people with an increased risk of skin cancer include those taking immunosuppressive medication, those with a history of skin cancer; and those with an allergic reaction to UV light. Unfortunately, humans do not sense the amount and type of UV radiation they are receiving.

Intelligent Fabrics 200 measure UV radiation using photodiodes 211. The incoming light reaches the photodiodes 211 then the photodiodes 211 convert the energy from the light into a small current. The amount of current depends on the type of photodiode 211 used (e.g. 200-400 nm photodiode) with respect to the intensity of the incoming light. The photodiodes 211 connect to Device 200 coupled to an article of clothing.

In one embodiment, a UV sensor 211 is placed in (and camouflaged by) a button. In another embodiment, a logo on a shirt could contain the sensor. The UV sensors 211 could then relay data to users so they can appreciate their sun exposure. Based on the fabric data generated by the sensor, the user may be alerted through an application to wear sunscreen or monitor the amount of time they are spending in the sun. The sensor 211 can detect different types of sunlight being emitted. Most commonly UVA radiation (400 nm to 320 nm), UVB radiation (320 nm to 280 nm), and UVC radiation (less than 280 nm). Recommended exposure times and minimum recommended SPFs can be output in response to the amount and type of UV radiation received from the UV sensor 211.

Inventory Checklist Functions

Intelligent Fabrics 200 can determine if like sensors are within the proximity of the Intelligent Fabrics 200. The textiles can interact with stationary sensors to determine if the wearer has specific objects, clothing, and items. The stationary sensors, using NFC 232, RFID or Bluetooth 231 to detect proximity, may send signals within the proximity of the wearer to determine if the proximity includes everything listed on an inventory checklist. If items are not accounted for by the stationary sensors then the stationary sensor may alert the wearer of the missing items or send signals to another device or sensor that the wearer can view. For example, if a wearer passes a stationary sensor or beacon by his garage door that checks for the proximity of the wearer for a wallet and briefcase, then finds that no wallet can is found in the proximity of the wearer, the stationary sensor will signal an alarm to sound on the phone of the wearer to alert the wearer of the missing wallet.

Everything listed on the inventory checklist may be too hard for a single person to carry at one time. In this scenario, the stationary sensor can mark items off the checklist as they pass the sensor. Items will continue to be marked off the checklist as the person passes the stationary sensor each time. Alerts can be sent to the phone of the person as they pass by the sensor each time to notify the user of what items have been brought and what items are still needed.

Sensors do not need to be stationary to perform inventory checklist functions. For example, a hockey gear bag may have a sensor in it to check to make sure that each type of padding and other necessary gear is included in the hockey gear bag. For example, the hockey gear bag sensor may search for gloves, chest pad, elbow pads, skates, shoulder pads, pants, jersey, and socks. The hockey gear bag sensor can notify the hockey player via a phone to alert him or her of items missing from the hockey gear bag. The hockey gear bag may also have its own display interface on the bag itself. The display may have a small light next to each piece of gear that is missing or the display may show the hockey player exactly what items are missing.

Sensors in the Intelligent Fabrics 200 may go through an interrogation periodically, when triggered by a device, or by coming in proximity of a unique sensor. The interrogation will make sure the wearer has all of the items on the inventory checklist. The interrogation will use wireless detection such as Wi-Fi 233, Bluetooth 231, Zigbee, or Radio Frequency.

In another embodiment, when the Intelligent Fabrics Device determines that a piece of clothing is put on (by monitoring gait or temperature), for instance a pair of pants, then the Device could wait twenty seconds or so, and then take "an inventory" to determine whether the user is now carrying other "tagged" items that might be carried in the Fabric Device or other clothes or accessories associated with it. For instance, when a user started to wear a pair of pants, as noted by the accelerometer's measurement of gait, then the Fabric Device might look for proximate signals from such items as tagged keys, wallet, and cell phone. RSSI could be used to determine that these items were close. Further evidence that these devices were now being carried would be accelerometer readings from the tags on such items that indicated that they were being moved in the same manner as the Fabric Device. If any of these items were missing, the Intelligent Fabrics Device could alert the users that an item that is normally in the pocket is missing.

In one embodiment, the Intelligent Fabrics Device could collect fabric data from the sensors in the fabric to determine if the fabric is being worn. This is done by taking the sensor data and comparing it to reference movement patterns in memory on the Intelligent Fabrics Device. If the accelerometer sensor patterns show no movement, then it would appear that the fabric is not being worn. But if there is movement, we need to further determine if the fabric is being worn, using the algorithm described above. If the Intelligent Fabrics Device determines that the fabric has just transitioned from not being worn to being worn, the Device waits and then looks for the keys, the wallet, and the cell phone. This could be done using several mechanisms. The easiest is simply to try to communicate with the phone directly or to tags attached to the keys or wallet (see U.S. patent application Ser. No. 14/816,024, "Method and Device to Set Household Parameters Based on the Movement of Items" filed by Inventor James D. Logan, hereby incorporated by reference in its entirety). Using NFC or Bluetooth with limited ranges, if the device does not respond, we can infer that the device is out of range and missing. In another embodiment, RSSI or a Time of Flight algorithm could be used to determine the distance between the item and the Device. If the item is not proximate, then the users should be alerted that the item is missing.

In another embodiment, the Intelligent Fabrics Device 200 checks to see if the sensors are detecting a "dressing" pattern. This pattern may include a temperature sensor seeing a change in temperature from room temperature to body temperature and the accelerometer data moving from stationary to a reference movement pattern that matching a "dressing" activity, for instance, a rapid vertical acceleration indicating a pair of pants being pulled up. When dressed, the Intelligent Fabrics Device 200 would wait a few seconds and then check for the items.

Leashing Items

Intelligent Fabrics 200 can be used to track items normally kept together using a leashing technique. This is similar to the inventory checklist without the trigger of putting the clothes on. Instead, the items are continually (while the fabric is being worn) leashed to the Intelligent Fabrics 200. In this embodiment, the Intelligent Fabrics use the communications subsystem to periodically search for the wallet, the keys and/or the phone (and/or other items), perhaps conducting the search every second while the fabric is worn. If an item is missing, then the fabrics alerts the user. The alert could be through the phone or directly from the fabric using a speaker or buzzer in the fabrics, or through vibration or a device for causing mild pain in the user (sticking the user with a pin, providing a small electrical shock, or creating heat). Heat could be generated by shorting two wires through a low value resister creating heat on the skin of the user. Alternatively, multiple open circuit uninsulated wires could run through the fabrics such that when the wires touched the skin of the user of the fabric, the user received a small shock. Heat or shock have the advantage of being silent (as opposed to the vibrate mode or buzzer used with cell phones). A pin on a small electromagnet could also be used to poke the user with a pin to signal an alert. In one embodiment, each item may have a different way to alert the user. Forgetting the phone may cause an electrical shock where forgetting the wallet may cause a buzz to emit from the phone speaker. The Intelligent Fabric 200 may have a button to stop the alert. In one embodiment, the techniques for notifying the user via fabric alert means could also be used to notify the user of a text arriving or a phone call ringing if the Fabric is paired with the phone. Such an alert means would lessen the need to wear a smart watch when a major reason for wearing such a watch is the ability to know a message or call is coming in if the phone's ringer is off. Different variations of the fabric alert methodology could be used to signal different types of messages or indicate some information about the sender.

Similar alerts could be given to the user for sitting too long in one place or for fidgeting at an inappropriate time, for example.

In another embodiment, an app on the phone could be used to configure the Intelligent Fabric 200, tying certain missing objects to types of alerts, and the app could also be used to override the alert and to silence the alert. Furthermore, the configuration tool could be used to set time boundaries for alerts, limiting reminders for keys only to weekdays for example. And it could set distance limits as well before an alert occurs. Thus, if a laptop is leashed to the Intelligent Fabrics 200, an alert would only occur if the laptop were more than 40 feet away from the Intelligent Fabrics 200, for example, but if the wallet were more than 4 feet from the fabrics, the alert would be configured to sound.

Event Access Functions

Intelligent Fabrics 200 can be used to unlock doors or similar environment blockades if a person is wearing the type of clothing necessary to enter an event. For example, a charity may have an event at a ballroom in a hotel. Instead of selling tickets the charity may have sold shirts with a unique sensor in the Intelligent Fabric. The charity only wants to allow access to people who have purchased the shirt from the charity. A unique sensor 16 in the shirt may communicate with sensors in the door to the ballroom at the hotel. The door will only unlock if a person is wearing the shirt with the unique sensor 16 standing within the monitoring range 24 of the scanners 18 by the door. Parameters for the door can be set to limit the number of times access shall be granted to a unique sensor. Near field communication technology using RFID or the internet may allow the Intelligent Fabrics to communicate quickly with the locked door.

In one embodiment, the door locking mechanism 18 will release when all necessary conditions are met. First, the smart fabric has to be valid so the unique sensor 16 is detected within the monitored range 24. When the unique sensor 16 is within the monitoring range 24 an authorization process will be initiated. The scanners 20 emit a RF signal which carries the authorization code of the door locking mechanism 18. This signal is received by the unique sensor 16. After receiving a correct authorization code from the RF signal the unique sensor 16 will output a signal that is received by the locking mechanism 18. The locking mechanism 18 determines if the received signal contains an authorized code. Upon receipt of an authorized code the locking mechanism will release.

Figure 3:
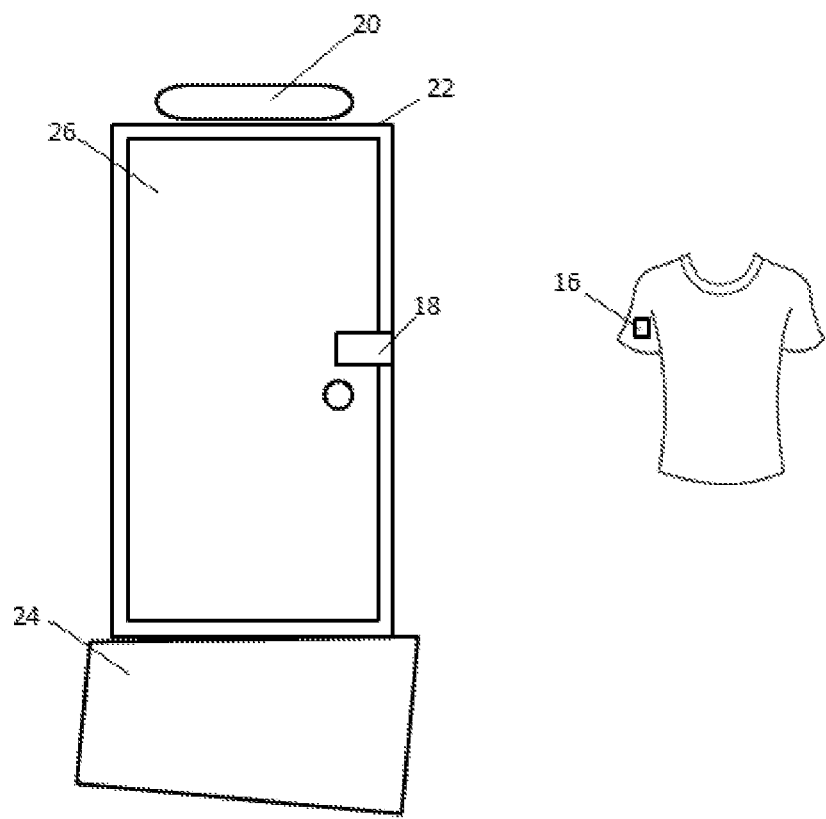
FIG. 3 illustrates Intelligent Fabrics authorized access feature to release locking mechanisms.

FIG. 3 shows a view of a door 26, wherein the scanners 20 are mounted above the door frame 22. In this case, the scanners are downward facing, creating the monitoring range 24. Once the unique sensor 16 comes within the monitoring range 24 the authorization process begins. If the unique sensor contains a correct authorization code then the locking mechanism 18 will release. The locking mechanism is shown in the right-centered portion of the door 26 but can be placed around another portion of the door.

Active Pairing Response

Intelligent Fabrics 200 may pair with real-world objects and other Intelligent Fabrics 200 to enrich the experience of the wearer with the environment. Textiles may communicate in many ways with the environment to allow access, deny access, and manipulate objects in the environment.

For example, Intelligent Fabrics 200 may be coupled to bowling shoes and only allow access to the bowling alley system to those wearing the shoes with the correct sensor. This would prevent people from wearing prohibited shoes while they bowl and ensure that proper bowling shoes are worn. Users may not be physically prevented from bowling by wearing the proper shoes because conventional bowling alleys allow for anyone to pick up a ball and bowl down any given lane. However, the bowling alley system can prevent the score from being attributed to a bowler when paired shoes and bowling balls are not used. This feature has greater implications for active pairing responses in controlled competitive environments. Not only can scores be automatically attributed to a player at any time, the bowling alley system can exclude scores for balls that were bowled unwarranted or improperly. The sensor in the bowling shoes may send signals to the sensor in a bowling ball to operably connect the bowler with his or her ball anywhere in the bowling alley. If the bowler moves from lane one to lane three the bowling alley system may automatically reroute the bowling ball from lane one to lane three. By pairing bowling shoes with a bowling ball that communicates with the bowling alley system the bowling ball can be delivered directly to the ball storage rack used by the bowler. The pairing shall not blindly deliver the bowling ball to the storage rack most proximal to the paired bowler shoes. This can negatively affect efficiencies and ball delivery times of the bowling alley system. Rather, robust software shall keep the bowling ball system organized with parameters to allow for intermittent trips away from the storage rack being used. Intermittent trips may include restroom trips or visiting with another bowler on an adjacent lane.

Bluetooth 231 may be used for its low power benefits combined with the short range communication applications Intelligent Fabrics 200 employ. Different classes of Bluetooth chips 231 should be used depending on the range desired. Bluetooth Device Addresses should be used by applications with Intelligent Fabrics 200 over a wireless connection. The Bluetooth Device Address has a lower address part (LAP), an upper address part (UAP), and a non-significant address part (NAP). Page scans of the device access code should be used to target Bluetooth devices in range. Bluetooth device 231 located in the Intelligent Fabrics 200 require authentication and encryption keys to securely pair connections from sensor to sensor.

Open Zippers and Buttons Notification

Intelligent Fabrics 200 can detect when an unwanted fly or button is open or unbuttoned on a garment. This can prevent unwanted embarrassments to the user. For example, the "your fly is open" problem can be cured by having sensors 214 tell when a circuit attached close to the top of the zipper is open or closed because an electrical circuit on the fly will be closed when the zipper is closed. Sensors 214 therefore could be programmed to look for open circuits on the fabric.

A zipper may use the interlocking teeth coupled with a conductive element to determine whether the zipper is open or closed. The conductive element will have two parts. One part of the conductive element will be on at least one zipper tooth on the first interlocking row of teeth. Another part of the conductive element will be on at least one zipper tooth on the second interlocking row of teeth. When the zipper is closed the two or more parts of the conductive element will meet to complete a circuit. A sensor 214 will operably connect to the conductive element. The sensor 214 will send an electrical signal through the conductive element to determine if the zipper is opened or closed. If the zipper is opened the sensor 214 can send a wireless signal, under certain circumstances, to a device or phone which will alert the wearer of the open fly.

The wireless signal needs to be conditioned based upon whether the pants are being worn at the moment. An open zipper is not a reason for an alert if the pants are in storage or in the laundry. Thus the Smart Fabrics needs to determine if the pants are being worn. This is done either through a temperature sensor or by comparing the movement of the sensors to those movements that occur when someone is wearing the clothes. In one embodiment, if the accelerometers on the waist are upright then the pants are being worn. See the description of these algorithms above.

A wireless signal alerting the wearer that the zipper is open is not needed, of course, if the zipper is open because the user is using the bathroom. When the zipper is purposely opened for this purpose, however, the wearer will be sitting or standing relatively still for some period of time. Sensors on the Smart Fabrics can determine when the user starts walking about again, signaling the end of the bathroom break, and if the zipper remains open after a certain period of time after the resumption of such traveling motions, the sensor will send the wireless signal to the phone that will be converted into an alert.

The wireless signal may be in the form of a SMS text message from the clothes to the user's cell phone or an audio alert through a phone call. The wireless signal could also be a Bluetooth message to the phone, perhaps sent to an app on the phone that notifies the user. The user may also be alerted through a speaker or buzzer in the fabrics, or through vibration or a device for causing mild pain in the user (sticking the user with a pin, providing a small electrical shock, or creating heat).

Buttons may have a conductive element that connects with the textile when the button is fastened. For example, the top inside loop of a textile may have a conductive element that fastens around a conductive element on the button. When the button is not fastened, a sensor 213 operably connected to the conductive element of the textile will alert the user of the unfastened button. This may be seen as a common feature on the back left pockets of male shorts and pants because this is the pocket a wallet is commonly placed. The alert may be set to go off after a ten minute unfastened period so that the wearer is not bombarded with unnecessary alerts.

Belt loops may have sensors 213 to tell if a belt was run through the inside of a belt loop or outside of the belt loop. Sensors 213 may signal the user through and application or device to alert the user that the belt was not placed inside of the loops.

Forgotten Phone

One embodiment of the Intelligent Fabrics is the ability to address the leaving of the phone in a pants pocket when changing clothes. The Device uses an accelerometer in the fabrics to check for the motion pattern on taking off of the pants and then checks to see if the phone is removed within a period of time, perhaps 10 seconds. If the Intelligent Fabrics Device determines that the pants were taken off, a message indicating that the pants were removed is sent to an app running on the phone. The phone app will then check the accelerometer on the phone to see if it is not moving. If no movement is detected, the app will ring the phone (or issue another audible alert) to remind the user to take the phone with him. In addition, if the user is wearing a smart watch, such alert may be sent to the watch as well, as the phone alert may not be heard if the user has walked away and if out of audible range of the phone. If the phone is moving once the pants have been taken off, then it is assumed that the phone has been removed and no alert is given to the user. Instead of using an accelerometer on the pants, a thermal sensor could be used to detect that the pants are no longer being worn.

In another embodiment, the Intelligent Fabrics Device 200 checks to see if the sensors are detecting an "undressing" pattern. This pattern may include a temperature sensor seeing a change in temperature from body temperature to room temperature and the accelerometer data moving from a reference movement pattern that matching an "undressing" activity to stationary. When undressed, the Intelligent Fabrics Device 200 would wait a few seconds and then check to make sure the phone had been removed.

In still another embodiment, when the Fabrics Device senses that the clothes are removed, it communicates to the phone, and the movement patterns for the phone are compared to the movement patterns of the clothes. If neither the phone nor the Fabrics are moving, then the phone has been left. However, if the phone is moving and the Fabrics are not, then do not send the message, because the phone is not forgotten.

Battery Belt

Intelligent Fabrics may use batteries 222 to power the electronics coupled with the textiles. The batteries 222 can be recharged and may be included in each individual textile. Alternatively, a belt that stores energy and distributes it across the electrical devices on the wearer may be employed. The battery belt may charge batteries 222 within and connected to the textiles or act as the sole power source for all or some of the textiles used.

The belt may charge or power the pants through conductive areas on the inside of the belt loops of pants. The conductive areas on the insides of the belt loop can use the power from the belt by connecting to conductive areas on the belt. Alternatively, a belt buckle may act as the connection for voltage to flow from the belt to the pants or shirt. The shirt may connect to a clasp on the belt buckle or a conductive means from the inside of the pants when the shirt is tucked in.

Inductive charging 223 may be employed to charge textiles without the use of a more direct connection. An alternating current from a transmitter coil in the belt may induce a voltage in a receiver coil found in the shirt and pants. Alternatively, the belt may be charged by a belt charger that hangs in the closet. The belt charger would be connected to AC current and would connect to contacts on the belt while the belt is hanging in the closet. Alternatively, the belt could be charged inductively.

Phone Fabric

Intelligent Fabric 200 may employ a microphone so that the wearer can use the Intelligent Fabric 200 as a hands free phone. A Bluetooth enabled microphone and speaker in a textile can allow the user to take calls anywhere. For example, a hooded article of clothing may have the Bluetooth enabled microphone and speaker positioned so that the wearer can talk on the phone. The microphone may be positioned on the lower inner portion of the hood allowing acoustic signals from the wearer's mouth to be easily picked up. The speaker may be positioned on the upper inner portion of the hood so that incoming sounds can easily be heard. The embedded microphone, speaker, and receiver may be permanently sewn into the article of clothing or attached by removable means. Common removable methods of attachment for the Intelligent Fabric 200 may be Velcro, zippers, or string ties.

Tapping on the fabrics could be used to signal the phone, as could saying certain words (i.e. "Hey Siri"). For instance, a double tap on a sensor could cause the Intelligent Fabrics to record a memo until another double tap is received. The Intelligent Fabrics could also take instructions itself through the microphone. To save battery, the microphone may only listen for keywords when the accelerometers determine that the Fabrics are being worn.

Storing Energy

Intelligent Fabrics may store electrical energy on a capacitor 221 or battery 222 connected or intertwined within the textile. The capacitor 221 or battery 222 should be located in a position in the fabric that would cause the wearer not to notice its presence at all. It would be in such a position as to protect the wearer's skin from any discomfort which may be caused by an exposed item.

Self-Charging

Intelligent Fabrics 200 may employ solar cells 224 to collect light and charge batteries 222. The solar cells 224 can be arranged in panels or woven into small fibers of the textile. The solar cells 224 should be placed in locations on the wearer where light may optimally be collected such as the top of a hat or the shoulder regions.

Intelligent Fabrics 200 may transfer the kinetic energy created by the wearer. Kinetic energy 223 is transferred to the textile or other device as the wearer moves the textile. As the textile moves around objects or friction is created, the kinetic energy 223 charges batteries 222. Magnetic forces operably connected to the textile move across a coil to create an electric charge in the coil. The electric charge created in the coil is then sent to charge batteries 222.

Intelligent Fabrics 200 may employ an inner liner composed of a thermoelectric material that converts body heat into voltage. A thermoelectric film may attach to the skin which gathers heat energy from the body before converting the energy into electricity. A high-efficiency thermoelectric converter can be employed to power and charge the Intelligent Fabrics 200. Organic polymers that activate with a single degree change in Celsius of less should be employed on the inside of the Intelligent Fabrics. The polymers should come in direct contact with the skin.

Charging Other Devices

Intelligent Fabrics may charge other electronic devices such as cell phones, tablets, and laptop computers. Intelligent Fabrics may use a direct connection via a conventional charging cable (e.g. micro USB, iPhone Charger, etc.) or an inductive charge in the textile. When using a direct connection via a conventional charging cable, the textile may have a charging adapter nearest a convenient pocket so that the charging device can be placed in said pocket so the device will charge without the wearer having to hold on to the device. When inductively charging devices, the device that is desired to be charged shall be placed in the pocket or attachment with the wireless charging area. The device must be placed on the wireless charging area so that alternating current can flow from the transmitter coil to the receiver coil of the device.

Physical Storage of Intelligent Fabrics

The temperature at an event and the category of event that a person is about to attend may dictate what articles of clothing the person will wear. In hot temperatures where a person is about to participate in an active event the person will most likely wear a short sleeve shirt and athletic shorts. The closet that stores the Intelligent Fabrics 200 can be connected to the internet or a device that relays the data from a person's schedule to the closet. Based upon the data relayed to the closet, the closet can rearrange to allow the person an easy choice at a selection of an outfit that meets the needs of the event on the calendar. For example, if the calendar says "Work Christmas Party" then the closet may alert the person where his or her Christmas sweater is located along with a pair of slacks. The closet may alert the person by illuminating hangers where the desired articles of clothing are located. The closet may even have clothing on racks that can cycle from one type of clothing to the next. Rotating racks may be especially useful for maximizing the space in a small closest or taking advantage of the high ceilings that a closet may have. The closet may employ a carousel or cubby design that will automatically rotate depending on the calendar of the person.

Closet racks may provide a direct electrical connection to Intelligent Fabrics 200 via hangers that are conductively connected to the Intelligent Fabrics 200. Intelligent Fabrics 200 can lose the energy stored in them over time. Closet racks can be directly wired into the electrical system of a building allowing for the flow of energy from the building to the Intelligent Fabrics 200. For example, an Intelligent Fabrics 200 shirt may attach to a hanger so that the inside top shoulder section of the shirt is directly touching the top portion of the hanger. The top portion of the hanger may have an electrical connection with the semi-circular ring that hangs on the rack. When the Intelligent Shirt is hung on the rack, the electrical components in the Intelligent Shirt can charge and receive important updates to software executed by the Intelligent Shirt.

Contact Information Sharing

Phones may upload information pertinent to the wearer so that newly purchased Intelligent Fabrics 200 can store this information on memory located within the Intelligent Fabrics 200. For example, prior to an Intelligent Fabric 200 being purchased at a store the Intelligent Fabric 200 will know nothing about the personal information of its future wearer. Once the Intelligent Fabric 200 are worn, the wearer may wish to have the Intelligent Fabrics 200 store personal information. The Intelligent Fabric 200 may download contact information of the wearer's phone such as email address, street address, phone number, height, weight, eye color, job title, etc. Intelligent Fabrics 200 can download this information wirelessly over the internet or Bluetooth 231.

Motions may be used to share personal information between two people wearing Intelligent Fabrics 200. A sensor at the end of a shirt sleeve can detect when two people are shaking hands then automatically exchange vCards from each person's phone. Allowing people to exchange information without having to carry traditional business cards or waste time manually inputting the information into a smart phone can save lots of time. People do not want to share personal information with just anyone, so the smart phone of the wearer should allow for this feature to be toggled on and off. Near field communication 232 may also be employed to allow for the exchange of information and transactions. Near field communications 232 may be based on radio-frequency identification in the Intelligent Fabrics 200 or connections over the internet.

Synchronization with Laundry Cycle

Intelligent Fabrics 200 may employ accelerometers to determine when a washing or drying cycle has completed. Intelligent Fabrics 200 can send an alert to the phone or another device of the user to let the user know that the Intelligent Fabrics 200 are ready to be taken out of the washer or dryer.

Intelligent Hamper

The Intelligent Hamper may alert its owner when there is enough of a specific type of clothing to be washed efficiently in the washer and dryer. Each article of clothing has an electrical component that contains the washing and drying data depending on the type and composition of the article. By compiling the data from all articles of clothing in the hamper, a determination may be made as to whether a new load of laundry should begin. For example, the Intelligent Hamper may alert the user when fifteen or more articles of clothing of a white color are placed in the Intelligent Hamper. Fifteen is an arbitrary number that can be substituted with the optimal number of articles of clothing for effective and efficient washing and drying. This allows the user to save money by only running loads of clothing through the washer and dryer when there is enough articles of clothing to make a wash or dry operation worthwhile.

Intelligent Fabrics could also be used to assist a user in the search for a particular piece of clothing. For instance, if the user were looking for his favorite shirt, the user could activate an app on his cell phone to ask the Intelligent Fabric Device to identify where it is. The Device could determine its location by using GPS, IPS, its location proximate to other sensors, or by using RSSI or Time of Flight to calculate distance from the phone.

Weather Sensing

In many areas, the weather can change rapidly from fair weather to bad weather. Intelligent Fabrics could be used to predict the weather and suggest clothing to deal with the weather for the day.

Intelligent Fabrics 200 may have sensors that detect rapid changes in wind, humidity, or temperature conditions. Upon sensing a rapid change in wind, humidity, or temperature conditions in the ambient environment, the device could then alert the user to these changes, who may then choose to head to shelter before the rainy or stormy weather strikes or to put on coats or rain gear.

Alternatively, Intelligent Fabrics 200 could query the weather via a standard Internet weather service as the clothes are being chosen and use that weather report to assist the user in the choice of clothes. Intelligent Fabrics 200 can detect a decrease in barometric pressure through an aneroid barometer 212. Small rapid decreases in pressure are usually indicative of rain showers. The aneroid barometer 212 will predict upcoming bad weather when the barometric pressure has dropped over a period of time.

Once Intelligent Fabrics determines that the weather will be bad, proper clothes can be suggested on the user's cell phone. The Intelligent Fabrics Device could send an SMS text message, an audio phone message, or send data to an app on the phone suggesting that the user wear rubber sole shoes rather than leather shoes, and take an umbrella and a rain coat.

Intelligent Fabric Automatic Shutdown Modes

The sensors in Intelligent Fabrics 200 may have the ability to power off or sleep during triggered times. Triggered times may include a preset schedule or control from a secondary device such as a smart phone. Other triggered times may include when Intelligent Clothes enter events in which sensor output is not desired. For example, the sensors in Intelligent Fabrics 200 may power off when inside a running car. The sensors may detect that they are in a running car through sensor outputs or via direct communication with the car computer. An accelerometer 243 may detect accelerations due to various vehicle vibrations, such as, the vibration caused by friction between the tires and the road. In one embodiment, when the car is turned on, the car computer transmits a Bluetooth signal that is received by a Intelligent Fabrics receiver 231 which powers off (or switches to sleep mode) any sensors in the Intelligent Fabric 200 that were on. When the car is turned off, the car computer transmits a Bluetooth signal that is received by an Intelligent Fabric receiver 231 which toggles the power to the sensors.

The Intelligent Fabrics 200 may simply power down when the fabric is perfectly still for a period of time. A temperature sensor could be used in conjunction with the lack of movement to verify that the pants are not being worn. Or the temperature sensor could be used on its own to determine if the Intelligent Fabrics 200 are being worn.

The Intelligent Fabrics 200 may automatically power off or switch to sleep mode when placed in a closet. Transmitters with short ranges may be placed in the closet to send a signal automatically powering all Intelligent Fabrics 200 off or down. In one embodiment, a device with Near Field Communication ("NFC") is placed proximate to the closet. The NFC device interfaces with Intelligent Fabrics 200 in the 13.56 MHz RF band. This is an unrestricted NFC band that allows the NFC to establish a connection with Intelligent Fabrics 200 with no required licenses. The NFC device may be placed in the center of the closet and operate with a distance of 1.5 m. The NFC device transmits a signal that is received by an ISO 15693 NFC chip coupled to the Intelligent Fabrics 200. The ISO 15693 NFC chip 232 is eighteen by thirty-six millimeters with a thickness of 0.134 millimeters. The small thickness allows the chip to hide discretely in textiles. The NFC protocol is not limited for toggling the power of sensors within Intelligent Fabrics 200 and can be used for tracking, identifying, or other like functions.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A method of determining a distance a user has traveled based on foot movement, said method comprising:
   incorporating one or more fabric sensors into an article of clothing;
   collecting fabric data, comprising movement and relative location, from said one or more fabric sensors, said one or more fabric sensors positioned on a fabric;
   sending said fabric data from one or more fabric sensors to a processor that is connected to a memory;
   comparing, using said processor, said fabric data from one or more fabric sensors to reference movement patterns stored in said memory;
   determining a movement when said fabric data from one or more fabric sensors closely resembles said reference movement patterns;
   comparing a movement pattern to a prior movement patterns over a time interval to determine if the fabric sensor has transitioned from being stationary;
   collecting movement data until the fabric sensor determines, by comparing movement patterns to prior movement patterns, that the fabric has transitioned to being stationary; adding the movement data to a sum of movement data; and
   sending the sum of movement data to a user.

2. The method of claim 1 wherein the one or more fabric sensors consist of two or more fabric sensors, each positioned on a fabric at a different location on the fabric.

3. The method of claim 1 further comprising the transmitting of the running total through a communication system.

4. The method of claim 3 wherein the communications system uses a Bluetooth protocol.

5. The method of claim 1 wherein one or more of the fabric sensors is an accelerometer.

6. The method of claim 1 further comprising the counting of a number of times that the fabric transitions from being stationary.

7. A foot movement monitoring apparatus comprising:
   a fabric;
   a special purpose processor embedded in the fabric, the special purpose processor including a means for storing data;
   a means for communicating data to a user;
   a fabric sensor embedded in the fabric and electrically connected to the special purpose processor using wires embedded into the fabric;
   reference data stored in the memory representing movement data patterns; and instructions located in the memory for the special purpose processor, the instructions telling the special purpose processor to compare data from the fabric sensor with the reference data to determine if the fabric sensor is moving, to calculate a distance that the fabric sensor moves before the fabric sensor stops moving, and to sum the distances;
   and sending the sum of movement data to the user.

8. The apparatus of claim 7 further comprising a second fabric sensor embedded in the fabric and electrically connected to the special purpose processor using wires embedded into the fabric wherein the fabric sensor is located a different location on the fabric.

9. The apparatus of claim 8 further comprising second instructions located in the memory for the special purpose processor, the second instructions telling the special purpose processor to compare data from the second fabric sensor with the reference data to determine if the second fabric sensor is moving, to calculate a second distance that the second fabric sensor moves before the second fabric sensor stops moving, and to sum the second distances.

10. The apparatus of claim 9 further comprising the averaging of the second distances with the first distances.

11. The apparatus of claim 7 wherein a number of times that the fabric sensor starts and stops moving is counted.

12. The apparatus of claim 7 further comprising a communication system connected to the special purpose processor.

13. The apparatus of claim 12 wherein the means for communicating data to a user further comprises use of a Bluetooth protocol.

14. The apparatus of claim 7 wherein one or more of the fabric sensors is an accelerometer.

15. The apparatus of claim 7 further comprising a communication system integrated into the special purpose processor.

16. The apparatus of claim 7 further comprising a communication system integrated into the special purpose processor.

* * * * *